(12) United States Patent
Kyoung et al.

(10) Patent No.: US 12,555,012 B2
(45) Date of Patent: Feb. 17, 2026

(54) QUANTUM COMPUTER AND QUANTUM STATE SIMULATION METHOD USING SAME

(71) Applicants: HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

(72) Inventors: Woo-Min Kyoung, Yongin-si (KR); Young-Min Rhee, Daejeon (KR); You-Sung Jung, Daejeon (KR); Gwon-Hak Lee, Boryeong-si (KR); Kyung-Min Kim, Seongnam-si (KR); June-Koo Rhee, Daejeon (KR); Su-Min Lim, Seoul (KR)

(73) Assignees: HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 953 days.

(21) Appl. No.: 17/728,140

(22) Filed: Apr. 25, 2022

(65) Prior Publication Data
US 2023/0141618 A1    May 11, 2023

(30) Foreign Application Priority Data
Nov. 8, 2021    (KR) .................. 10-2021-0152282

(51) Int. Cl.
*G06N 10/20*    (2022.01)
(52) U.S. Cl.
CPC .............................. *G06N 10/20* (2022.01)

(58) Field of Classification Search
CPC ........ G06N 10/60; G06N 10/20; G06N 10/40; G06N 10/00; G06N 10/70; G06F 30/20
See application file for complete search history.

(56) References Cited

U.S. PATENT DOCUMENTS 8,280,699 B2   10/2012   Ichishima et al.
11,037,068 B2   6/2021   Girvin et al.
(Continued)

FOREIGN PATENT DOCUMENTS

KR    10-1090769 B1    12/2011
KR    2016-0086947 A    7/2016
(Continued)

OTHER PUBLICATIONS

Gao, Yvonne Y, et al. "Entanglement of bosonic modes through an engineered exchange interaction," Nature, vol. 566, pp. 509-512 (2019).

*Primary Examiner* — Brian W Wathen
(74) *Attorney, Agent, or Firm* — MCDONNELL BOEHNEN HULBERT & BERGHOFF LLP (57) ABSTRACT

A method of simulating a quantum state using a quantum computer is provided. The method includes simulating a quantum state of a target molecule using the quantum computer, measuring a Hamiltonian in a simulated quantum state of the target molecule, calculating energy from the Hamiltonian measurements, and calculating a ground state and ground energy of the target molecule through an optimization process of deriving a lowest energy state by adjusting parameters that determine the quantum state of the target molecule, wherein simulating of the quantum state is performed with the configuration of a quantum circuit in which one quantum bit (qubit) is assigned to a pair of spin orbitals.

8 Claims, 6 Drawing Sheets

(56) References Cited

U.S. PATENT DOCUMENTS

| | | | |
|---|---|---|---|
| 2006/0033097 A1 | 2/2006 | Freedman et al. | |
| 2010/0211366 A1 | 8/2010 | Ichishima et al. | |
| 2016/0292588 A1 | 10/2016 | Burkot | |
| 2020/0104740 A1* | 4/2020 | Cao | G06N 10/60 |
| 2021/0035009 A1* | 2/2021 | Babbush | G16C 60/00 |
| 2021/0374611 A1* | 12/2021 | Ronagh | G06N 3/0499 |
| 2022/0358393 A1* | 11/2022 | Anschuetz | G06N 10/20 |
| 2023/0142209 A1* | 5/2023 | Bauer | G06N 10/80 |
| | | | 716/100 |

FOREIGN PATENT DOCUMENTS

| | | | |
|---|---|---|---|
| WO | 2020/180672 A1 | 9/2020 | |
| WO | 2020/180902 A1 | 9/2020 | |
| WO | 2021/099428 A1 | 5/2021 | |

* cited by examiner

```
Algorithm 1 Quantum Circuit Part
Input:  M qubits initialized to '0' states
Output: Ground State Energy
 1: for "occupied orbital" i do
 2:     apply X_i
 3: end for
 4: for "occupied orbital" i, "virtual orbital" a do
 5:     apply U_a^i(θ_ai)
 6: end for
 7: Measure Pauli strings
 8: GE = 0
 9: for 0 ≤ p ≤ M do
10:     GE = GE + h_p c_p^† c_p
11: end for
12: for 0 ≤ p,q ≤ M do
13:     GE = GE + h_pq c_p^† c_p c_q^† c_q + h'_pq (c_p^† c_q + c_q^† c_p)
14: end for (p=q cases are excluded.)
15: for 0 ≤ p,q,r,s ≤ M do
16:     GE = GE + (h_pqrs)((c_p^† c_p)^{1/2} (c_r^† c_s)^{1/2} + c.c.)
17: end for (Cases corresponding to Colum or Exchange integrals are excluded; e.g. "p=q and r=s" cases.)
18: return GE
```

QUANTUM COMPUTER AND QUANTUM STATE SIMULATION METHOD USING SAME

CROSS REFERENCE TO RELATED APPLICATIONS

This application claims priority to Korean Patent Application No. 10-2021-0152282, filed on Nov. 8, 2021, which is incorporated herein by reference in its entirety.

BACKGROUND

Field of the Disclosure

The present disclosure relates to a method of calculating a ground state and ground energy by simulating a quantum state using a quantum computer.

Description of Related Art

It has been known since the 1980s that quantum computers and quantum algorithms operating on them can exhibit computational efficiencies that cannot be obtained from conventional classical algorithms for certain specific operations.

In the case of a quantum computer, which is hardware, a test model of several qubit level has been created since the 1990s, and a quantum computer with a level of several tens of qubits has been reported recently. In the field of quantum chemistry calculations, recently, there are many reports that quantum simulation using Variational Quantum Eigensolver (VQE) will be particularly effective in determining ground energy of various kinds of molecules.

VQE-based quantum chemistry calculations can be easily performed if there is a perfect quantum computer, but in the current quantum computer (NISQ, Noisy Intermediate Scale Quantum), it is not possible to perform meaningfully better calculations than classical computers due to limitations in the number of qubits and operating time.

The contents described in Description of Related Art are to help the understanding of the background of the present disclosure, and may include what is not previously known to those skilled in the art to which the present disclosure pertains.

SUMMARY

Therefore, an objective of the present disclosure considering the above point is to provide a method of approximating a quantum molecular model to enable meaningful quantum simulation even in the current level of quantum computer.

In order to accomplish the above objective, according to an aspect of the present disclosure, there is provided a method of simulating a quantum state using a quantum computer, the method including simulating a quantum state of a target molecule using the quantum computer, measuring a Hamiltonian in a simulated quantum state of the target molecule, calculating energy from the Hamiltonian measurements; and calculating a ground state and ground energy of the target molecule through an optimization process of deriving a lowest energy state by adjusting parameters that determine the quantum state of the target molecule, where simulating of the quantum state is performed with the configuration of a quantum circuit in which one quantum bit (qubit) is assigned to a pair of spin orbitals.

In an exemplary embodiment, in the quantum circuit, an exchange gate may be applied between qubits to control the qubits.

In an exemplary embodiment, the quantum state in the process of simulating the quantum state may be represented by the following equation $$|\Psi\rangle = \prod_{i,a} U_{ex,ia}(\theta_{ia})|\Psi_0\rangle$$
$$= c_0 | 11 \ldots 1100 \ldots 00\rangle + c_1 | 11 \ldots 1010 \ldots 00\rangle +$$
$$\ldots + c_M | 00 \ldots 0011 \ldots 11\rangle$$

where $|\Psi\rangle$: a qubit state prepared using Exchange ansatz,
$U_{ex,ia}$: exchange gate between the i-th occupied orbital and the a-th virtual orbital, and
$C_0 \ldots C_M$: the complex coefficient of the corresponding ground state.

In an exemplary embodiment, the energy is calculated by the following equation where $h_p = 2\varepsilon_p + J_{pp}$, $h_{pq} = 2J_{pq} - K_{pq}$, $h'_{pq} = -K_{pq}$, $$E = \left\langle \Psi \left| \sum_P^N h_p c_p^\dagger c_p + \sum_{pq}^N h_{pq} c_p^\dagger c_p c_q^\dagger c_q + \sum_{pq}^N h'_{pq}\left(c_p^\dagger c_q + c_q^\dagger c_p\right) \right|\Psi \right\rangle$$
$$+ (\text{non-bosonic terms})$$

$\varepsilon$, J, and K denote Hartree-Fock Orbital energy, Coulomb integrals, and Exchange integral, respectively,
$C_p^{(+)}$: single electron annihilation (creation) operator for orbital p, and
$C_q^{(+)}$: single electron annihilation (creation) operator for orbital q.

In an exemplary embodiment, a non-bosonic term is calculated by the following equation $$E_{nB} = \sum_{pqrs}^N h_{pqrs}(\langle \Psi | c_r^\dagger c_p | \Psi \rangle^{1/2} \langle \Psi | c_s^\dagger c_q | \Psi \rangle^{1/2} + c.c.)$$

where $h_{pqrs}$: Hartree-Fock orbital's two-body integral,
$C_r^{(+)}$: single electron annihilation (creation) operator for orbital r, and
$C_s^{(+)}$: single electron annihilation (creation) operator for orbital s.

In another aspect of the present disclosure, there is provided a quantum computer implementing the simulation method, and the quantum computer may be Noisy Intermediate Scale Quantum (NISQ).

In an exemplary embodiment, the quantum computer may include a quantum part performing the simulation of the quantum state and the measurement of the Hamiltonian, and a classical part performing the calculation of the energy and the calculation of the ground state and the ground energy.

According to the quantum state simulation method using the quantum computer of the present disclosure, it is possible to appropriately simulate the quantum state within an error of several mHartree with only a small number of qubits and qubit gates compared to the existing ones, by using an algorithm using a new mapping method.

Although quantum simulation is attracting attention as a field that can show quantum supremacy in the coming future, it is difficult to show meaningful effects only with quantum computers that are currently available.

The present disclosure greatly reduces the quantum resource required for a quantum algorithm, and enables quantum simulation within a reasonable error range only with a quantum volume of an appropriate size.

DETAILED DESCRIPTION

In order to fully understand the purposes, configurations, and effects of the present disclosure achieved by implementation of the present disclosure, a reference should be made to following description and accompanying drawings illustrating preferred embodiments of the present disclosure.

In describing preferred embodiments of the present disclosure, a description of well-known techniques or a repeated descriptions of the same configuration that may unnecessarily obscure the gist of the present disclosure will be minimized or omitted.

Figure 1:
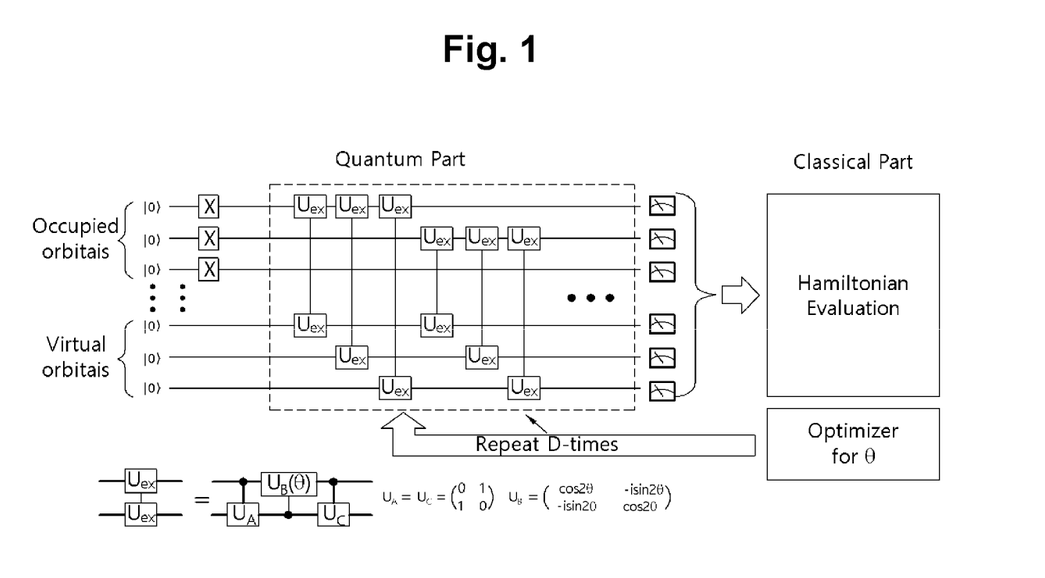
FIG. 1 illustrates a quantum circuit of a quantum computer to which the present disclosure is applied.
Figure 2:
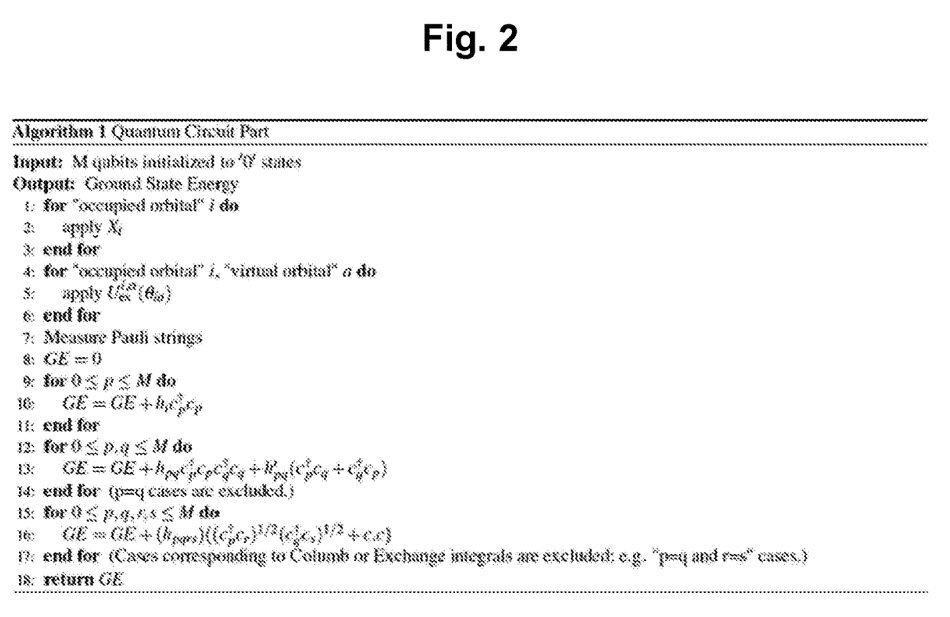
FIG. 2 illustrates an algorithm of the quantum computer.
Figure 3:
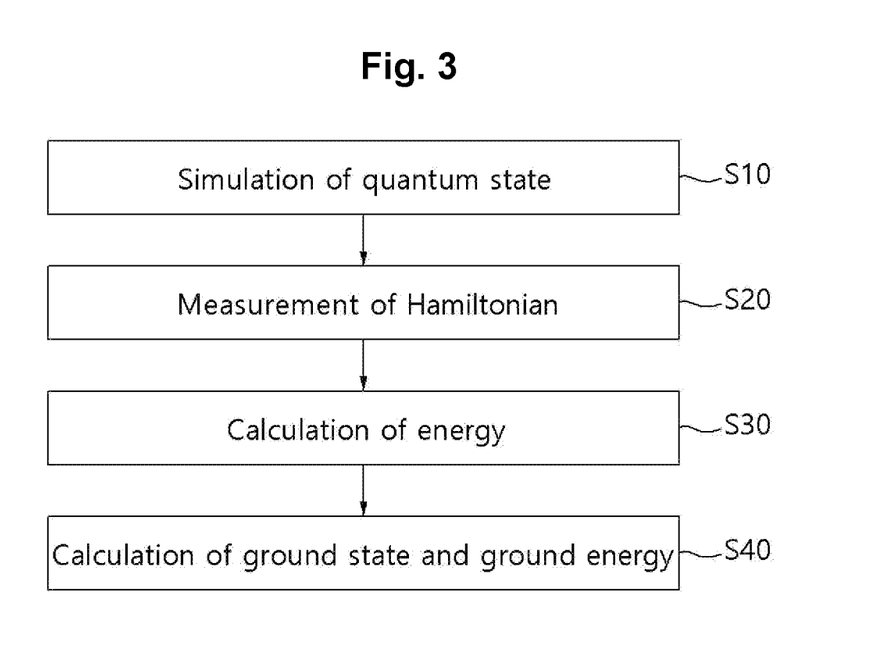
FIG. 3 illustrates a method according to the present disclosure.

FIG. 1 illustrates a quantum circuit of a quantum computer to which the present disclosure is applied, FIG. 2 illustrates an algorithm of the quantum computer, and FIG. 3 illustrates a simulation method according to the present disclosure.

Hereinafter, a quantum state simulation method using a quantum computer, and a quantum computer used in the simulation method according to an embodiment of the present disclosure will be described with reference to FIGS. 1 to 3.

In the quantum state simulation method of the present disclosure, a quantum state of molecules is simulated using an algorithm, as illustrated in FIG. 2, and the procedure of FIG. 3 by a quantum circuit of a Variational Quantum Eigensolver (VQE) structure including a quantum part and a classical part as illustrated in FIG. 1.

VQE is a variational method that finds an optimal solution by exchanging data between a quantum computer and a classical computer so as to simulate the quantum state (Ansatz) of a certain molecule at S10 and represent the qubit ansatz quantum state with a quantum algorithm of a quantum computer for obtaining the ground state (an inherent energy state of a material) of a molecule.

Then, the Hamiltonian (an operator expressed by the sum of kinetic energy and potential energy) of the simulated quantum state is measured at S20 to calculate energy at S30, and an optimization process in which parameters determining a quantum state are adjusted to find the lowest energy state is performed to obtain the ground state and ground energy of a molecule at S40.

The quantum part in the VQE structure simulates the quantum state of a certain molecule, expresses the qubit ansatz quantum state determined by the parameters using a quantum computer, and measures the Hamiltonian thereof.

The classical part calculates energy from the measurements, determines a new parameter that minimizes this energy, and uses the parameter to prepare a new quantum state in the next quantum part and proceed with the optimization process.

To elaborate on the quantum part, a circuit simulating Ansatz in a quantum computer is represented by a combination of Parameterized Exchange Gates that preserve the number of electrons. Among the orbitals obtained through Hartree-Fock (HF) calculation, all combinations of occupied orbitals filled with electrons due to low Hartree-Fock orbital energy and virtual orbitals that are empty due to high Hartree-Fock orbital energy may be operated with the exchange gates to form the superposition in an excitation state.

In addition, the classical part measures the given circuit to obtain the corresponding energy state, determines the parameter values assigned to respective exchange gates using an optimization algorithm such as Powell or Cobyla to minimize the energy state, and obtains the converging ground energy after the optimization process.

Here, the exchange gate is an operation that operates on two qubits and preserves the sum of the qubits with state 1. For example, when the two qubits have the same state (when the two qubits are in the states 0,0 and 1,1, respectively), there is no change after operation, but in other cases, the overlapping states 0,1 and 1,0 are formed according to the defined parameters.

In addition, the optimization algorithm is difficult to implement in a quantum computer in the NISQ era, so the parameters to minimize energy are optimized and the converged energy value is returned through optimization algorithms such as Powell or Cobyla used in classical computers.

In particular, the simulation of a quantum state (Ansatz) in the present disclosure is different from the conventional one. That is, unlike the conventional ansatz in which one qubit (quantum bit) is designated for each of spin orbitals in a pair, in the present disclosure, as illustrated in the algorithm of FIG. 2, one qubit is designated for the pair of spin orbitals, so the number of required qubits is reduced by half compared to the conventional one.

Furthermore, an additional error correction method (non-bosonic correction) is added for this purpose. Hereinafter, a Boson approximation method and a Non-Boson correction method will be described.

Although in conventional methods such as Bravyi-Kitaev or Jordan-Wigner, or parity, when simulating a molecular state with a quantum computer, one qubit is assigned to a spin orbital including spin information, in the present disclosure, one qubit is assigned to a pair of spin orbitals with opposite spin and the same spatial orbital.

Therefore, the number of qubits required for quantum simulation is halved. In addition, in a quantum state in which electron pairs move together, the spin behaves like Boson that is an integer spin particle, so it has an advantage in that the exchange phase may not be considered.

The Boson approximation method is a mapping method in which $c_p^{(+)} = a_{p\uparrow}^{(+)} a_{p\downarrow}^{(+)}$ where $c_p^{(+)}$ is a p-th qubit annihilation (creation) operator, $a_{p\uparrow}^{(+)}$ is a p-th spin-up orbital annihilation (creation) operator, and $a_{p\downarrow}^{(+)}$ is a p-th spin-down orbital annihilation (creation) operator. The algorithm of FIG. 2 is an algorithm in which a part of electronic structure Hamiltonian expressed as an orbital annihilation (creation) operator in which electronic pairs move together is expressed as a qubit annihilation (creation) operator.

Here, the coefficients $h_p$, $h_{pq}$, $h'_{pq}$, and $h_{pqrs}$ are respectively given with respect to the orbital energy $\varepsilon$, which is the HF calculation result, the Coulomb Integral matrix J, and the Exchange integral matrix K as follows:

$$h_p=2\varepsilon_p+J_{pp},\ h_{pq}=2J_{pq}-K_{pq},\ h'_{pq}=-K_{pq},$$
$$h_{pqrs}=\langle pq\|re\rangle$$

The non-bosonic correction for simulating the non-bosonic behavior of electrons is expressed in the 15-th to 17-th lines of the algorithm of FIG. 2.

As such, unlike the Jordan-Wigner or Brevy-Kitaev mapping of the conventional VQE, in the present disclosure, one electron pair treated as a singlet pair is mapped to one qubit, so that the total number of qubits required for quantum simulation can be reduced by half.

In the coupling of the Hartree-Fock orbitals mapped in this way, a heuristic method is used instead of conventional methods such as Unitary Coupled-Cluster with Singles and Doubles (UCCSD). As illustrated in FIG. 1, an exchange gate composed of two Controlled NOT (CNOT) gates (which can see quantum entanglement) and one Controlled-rotation is added between all qubits to make a coupling.

Accordingly, the state including the excitation of all electron pairs, that is, all bosonic double excitations, can be simulated, and the ground energy in this case can be calculated by multiplying the appropriate coefficients calculated from the Hartree-width orbital.

First, as described above, qubit Ansatz is prepared through a quantum circuit as follows:

$$|\Psi\rangle = \prod_{i,a} U_{ex,ia}(\theta_{ia})|\Psi_0\rangle$$
$$= c_0|11\ldots1100\ldots00\rangle + c_1|11\ldots1010\ldots00\rangle +$$
$$\ldots + c_M|00\ldots0011\ldots11\rangle$$

Then, the ground state is calculated from the measurements of Ansatz using the following equation:

$$E = \langle\Psi|\sum_P^N h_p c_p^\dagger c_p + \sum_{pq}^N h_{pq} c_p^\dagger c_p c_q^\dagger c_q + \sum_{pq}^N h'_{pq}(c_p^\dagger c_q + c_q^\dagger c_p)|\Psi\rangle$$
$$+ (\text{non-bosonic terms})$$

In addition, since this mapping method cannot calculate a non-bosonic term, the following equation is added to correct this.

$$E_{nB} = \sum_{pqrs}^N h_{pqrs}\left(\langle\Psi|c_r^\dagger c_p|\Psi\rangle^{1/2}\langle\Psi|c_s^\dagger c_q|\Psi\rangle^{1/2} + c.c.\right)$$

In the direction of lowering the total energy calculated in this way, parameters of the gate used for the Ansatz preparation are adjusted to finally obtain ground energy.

In this way, the calculation accuracy is improved by introducing the non-bosonic excitation term, and unlike the Bosonic approximation method attempted previously, an algorithm considering the non-bosonic terms as Hamiltonian perturbation is implemented in which the electron correlation is interpreted as the $1^{st}$ order perturbation theory so that the part that can be considered from the Fermion Hamiltonian is added to the non-bosonic terms.

The terms in the above equation are defined as follows:
$|\Psi\rangle$: a qubit state prepared using Exchange ansatz,
$U_{ex,ia}$: exchange gate between the i-th occupied orbital and the a-th virtual orbital,
$C_0\ldots C_M$: the complex coefficient of the corresponding ground state, Bosonic Hamiltonian Matrix Elements $$h=2\varepsilon_p+J_{pp},\ h_{pq}=2J_{pq}-K_{pq},\ h'_{pq}=-K_{pq}$$

Here, $\varepsilon$, J, and K denote Hartree-Fock Orbital energy, Coulomb integrals, and Exchange integral, respectively.
$C_p^{(+)}$: single electron annihilation (creation) operator for orbital p,
$C_q^{(+)}$: single electron annihilation (creation) operator for orbital q,
$C_r^{(+)}$: single electron annihilation (creation) operator for orbital r,
$C_s^{(+)}$: single electron annihilation (creation) operator for orbital s, and
$h_{pqrs}$: Hartree-Fock Orbital's two-body integral.

Figure 4:
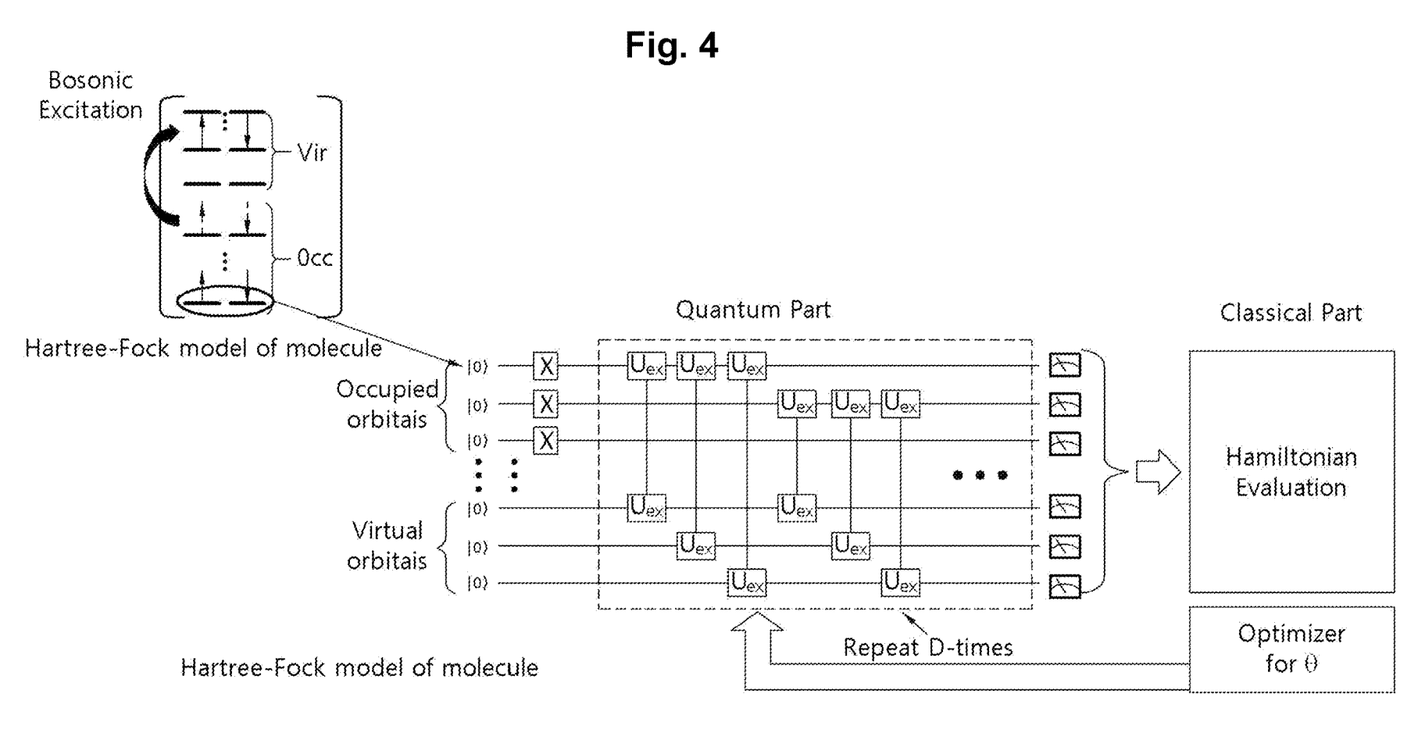
FIG. 4 illustrates a simulation considering only the Bosonic term.

FIG. 4 illustrates a simulation considering only the Bosonic term, which shows the case in which two electrons transition together in a pair, but also includes the case in which two electrons transition to another state (Approximation to Non-Bosonic term).

The ground energy of $Li_2O$ was analyzed through the following examples.

1. Preprocessing

HF calculations obtained using computational chemistry libraries such as Psi4 or PySCF is performed to obtain orbital energy, Coulomb Integral, and Exchange Integral of an electronic structure, and on the basis of the obtained values, Pauli Hamiltonian is obtained according to Algorithm 1.

2. Quantum Circuit

A quantum circuit that simulates a quantum state is configured. A Pauli X operator is applied to fill low-energy orbitals (Occupied Orbitals), having the number of electron pairs, with electron pairs. Next, the Exchange Gate is applied to all combinations between the Occupied Orbitals and the Empty Virtual Orbitals, the Basis Change Gate for measuring the Pauli Hamiltonian obtained in Item. 1 is applied, and then the measurement operator is applied.

3. Classical Part

Energy is minimized through optimization algorithms such as Powell or Cobyla, and the converged energy is returned.

4. Derivation of Potential Energy Surface (PES)

After repeating Items 1-3 for various molecular structures (e.g., the distance between Li—O), PES is derived based on the ground energy obtained.

Figure 5:
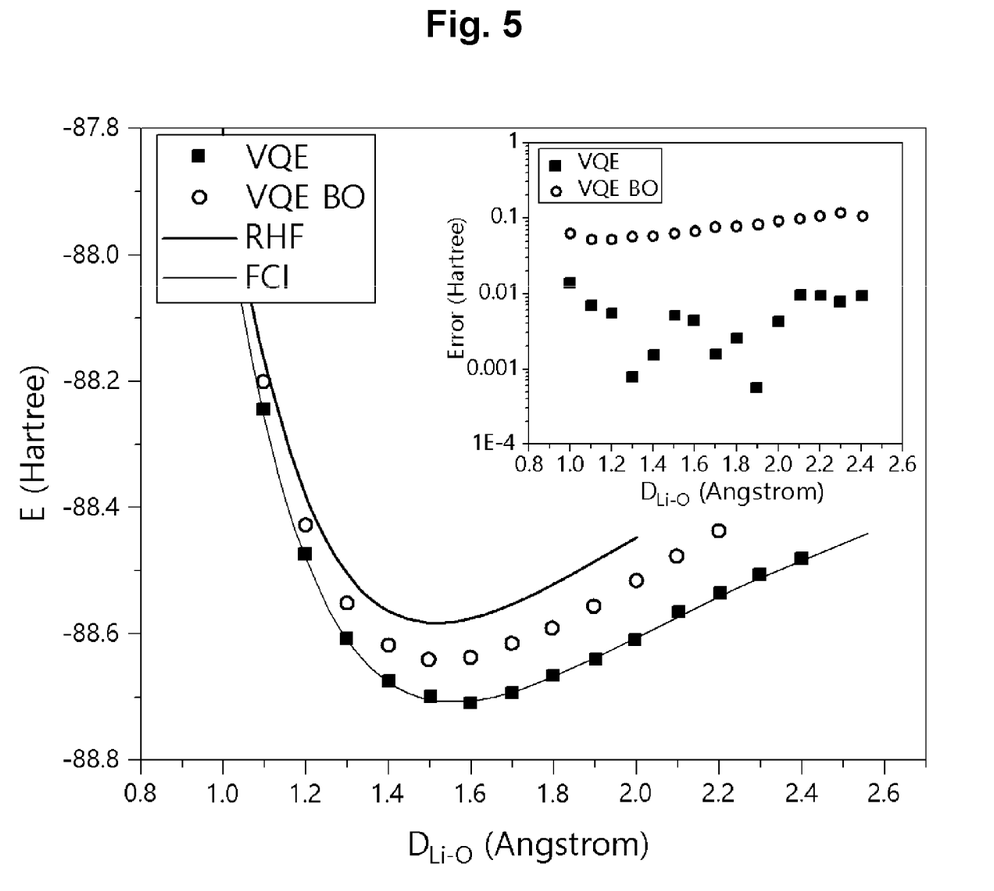
FIG. 5 illustrates theoretical results and calculated values for $Li_2O$ ground energy calculated by the present disclosure.
Figure 6:
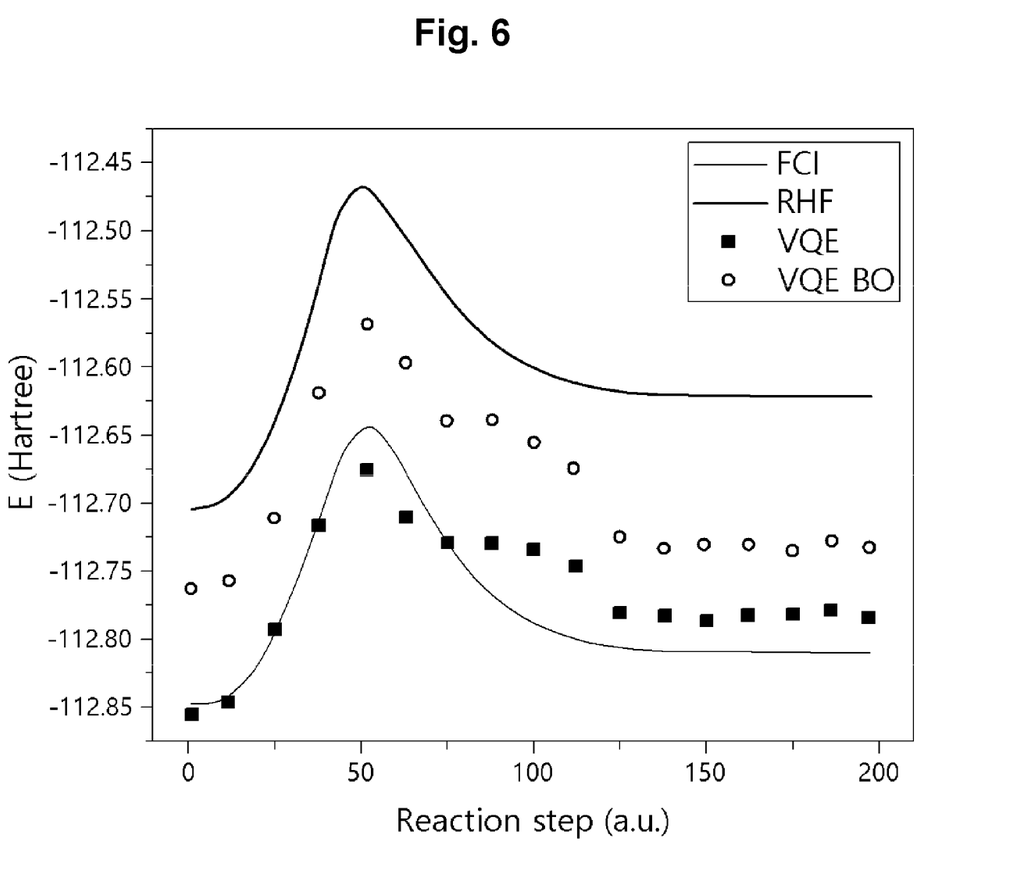
FIG. 6 illustrates theoretical results and calculated values for ground energy of a specific reaction calculated by the present disclosure.

FIG. 5 illustrates theoretical results and calculated $Li_2O$ ground energy calculated by the present disclosure, and FIG. 6 illustrates theoretical results and ground energy of reaction $CH_2OH^+ \rightarrow HCO^+ + H_2$ calculated by the present disclosure.

In FIGS. 5 and 6, VQE is a calculation result according to the present disclosure in which a non-Bosonic term is considered, and VQE BO is a calculation result in which only a Bosonic term is considered. In addition, Full Configuration Interaction (FCI) is one of the Post-Hartree-Fock methods, and has the form of a linear combination of all possible excitation operators. This is an analysis method considering all of interactions of electrons in a material that can obtain the most accurate solution, but also has a problem in that for general materials, the amount of calculation increases very rapidly, thereby making it practically difficult to obtain a solution.

RHF stands for Restricted Hartree-Fock, so it means, among the Hartree-Fock methods, a method in which all spatial orbitals form two spin orbitals.

In the case of Unrestricted HF (UHF), there is no need for any pair of spin orbitals to share the same space orbital. The graph shows the ground energy calculated in this way.

From the foregoing description, it can be seen that the calculations by the present method are more consistent with the theoretical results.

As can be seen from these results, with the algorithm using the new mapping method of the present disclosure, the dissociation curve of a $Li_2O$ molecule, which previously required 30 qubits and tens of thousands of 2-qubit-gates, can be appropriately simulated within an error of several mHartrees with 12 qubits and about 100 2-qubits-gates alone.

In addition, the chemical reaction ($CH_2OH \rightarrow CHO + H_2$) in which reactant and product are all closed-shell-molecules could also be simulated by the algorithm of the present disclosure, and a reaction barrier of similar size could be obtained.

Quantum simulation is attracting attention as a field that can show quantum supremacy in the near future, but it is difficult to show a meaningful effect only with the currently operable NISQ device. The present disclosure greatly reduces the quantum resource required for a quantum algorithm so as to enable quantum simulation within a reasonable error range only with a quantum volume of an appropriate size.

While the present disclosure as described above has been described with reference to the illustrated drawings, the present disclosure is not limited to the disclosed embodiments, and it is obvious to a person skilled in the art that various modifications and variations can be made without departing from the spirit and scope of the present invention. Therefore, it is apparent that such modifications or variations belong to the claims of the present invention, and the scope of the present invention should be interpreted based on the appended claims.

The invention claimed is:

1. A method of simulating a quantum state using a quantum computer, the method comprising:
    simulating a quantum state of a target molecule using the quantum computer;
    measuring a Hamiltonian in a simulated quantum state of the target molecule;
    calculating energy from the Hamiltonian measurement; and
    calculating a ground state and ground energy of the target molecule through an optimization process of deriving a lowest energy state by adjusting parameters that determine the quantum state of the target molecule,
    wherein simulating of the quantum state is performed with the configuration of a quantum circuit in which one quantum bit (qubit) is assigned to a pair of spin orbitals.

2. The method of claim 1, wherein in the quantum circuit, an exchange gate is applied between qubits to control the qubit.

3. The method of claim 1, wherein the quantum state in the process of simulating the quantum state is represented by the following equation $$|\Psi\rangle = \prod_{i,a} U_{ex,ia}(\theta_{ia})|\Psi_0\rangle$$
$$= c_0|11 \ldots 1100 \ldots 00\rangle + c_1|11 \ldots 1010 \ldots 00\rangle +$$
$$\ldots + c_M|00 \ldots 0011 \ldots 11\rangle$$

where $|\Psi\rangle$ is a qubit state prepared using Exchange ansatz, $U_{ex,ia}$ is exchange gate between the i-th occupied orbital and the a-th virtual orbital, and $C_0 \ldots C_M$ is the complex coefficient of the corresponding ground state.

4. The method of claim 3, wherein the energy is calculated by the following equation $$E = \left\langle \Psi \middle| \sum_P^N h_p c_p^\dagger c_p + \sum_{pq}^N h_{pq} c_p^\dagger c_p c_q^\dagger c_q + \sum_{pq}^N h'_{pq}(c_p^\dagger c_q + c_q^\dagger c_p) \middle| \Psi \right\rangle$$
$$+ (\text{non-bosonic terms})$$

where $h_p = 2\varepsilon_p + J_{pp}$, $h_{pq} = 2J_{pq} - K_{pq}$, $h'_{pq} = -K_{pq}$, ε, J, and K denote Hartree-Fock Orbital energy, Coulomb integrals, and Exchange integral, respectively, $C_p^{(+)}$ is a single electron annihilation (creation) operator for orbital p, and $C_q^{(+)}$ is a single electron annihilation (creation) operator for orbital q.

5. The method of claim 4, wherein a non-bosonic term is calculated by the following equation $$E_{nB} = \sum_{pqrs}^N h_{pqrs}\left(\langle\Psi|c_r^\dagger c_p|\Psi\rangle^{1/2}\langle\Psi|c_s^\dagger c_q|\Psi\rangle^{1/2} + c.c.\right)$$

where $h_{pq}rs$ is Hartree-Fock Orbital's two-body integral, $C_r^{(+)}$ is a single electron annihilation (creation) operator for orbital r, and $C_s^{(+)}$ is a single electron annihilation (creation) operator for orbital s.

6. A quantum computer implementing the simulation method of claim 1.

7. The quantum computer of claim 6, wherein the quantum computer is Noisy Intermediate Scale Quantum (NISQ).

8. The quantum computer of claim 7, comprising a quantum part performing the simulation of the quantum state and the measurement of the Hamiltonian, and a classical part performing the calculation of the energy and the calculation of the ground state and the ground energy.

* * * * *